(12) United States Patent
Kudou

(10) Patent No.: US 6,374,097 B1
(45) Date of Patent: Apr. 16, 2002

(54) RADIO TYPE SELECTIVE CALLING RECEIVER AND METHOD OF RECEIVING SELECTIVE CALLING

(75) Inventor: Hiroshi Kudou, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/245,450

(22) Filed: Feb. 5, 1999

(30) Foreign Application Priority Data

Feb. 24, 1998 (JP) .......................................... 10-041701

(51) Int. Cl.⁷ ................................................ H04B 1/06
(52) U.S. Cl. .................................. 455/232.1; 455/234.2
(58) Field of Search ......................... 455/232.1, 232.2, 455/234.2, 250.1, 234.1; 375/345; 330/126

(56) References Cited

U.S. PATENT DOCUMENTS

| | | | | |
|---|---|---|---|---|
| 4,327,331 A | * | 4/1982 | Yoshimi et al. ............. | 330/126 |
| 5,613,230 A | * | 3/1997 | Gottfried et al. ......... | 455/234.1 |
| 5,687,195 A | * | 11/1997 | Hwang et al. ........... | 455/234.2 |
| 6,044,253 A | * | 3/2000 | Tsumura .................. | 455/234.1 |
| 6,070,062 A | * | 5/2000 | Yoshida et al. .......... | 455/234.1 |
| 6,072,998 A | * | 6/2000 | Kaku ....................... | 455/234.2 |

FOREIGN PATENT DOCUMENTS

| | | |
|---|---|---|
| GB | 2296633 A | 7/1996 |
| JP | 60-182812 | 9/1985 |
| JP | 3-54891 | 8/1991 |
| JP | 3-54892 | 8/1991 |
| JP | 5-75490 | 3/1993 |
| JP | 6-213676 | 8/1994 |
| JP | 7-226970 | 8/1995 |
| JP | 8-139632 | 5/1996 |
| JP | 8-307172 | 11/1996 |
| JP | 8-316736 | 11/1996 |
| JP | 9-223950 | 8/1997 |
| JP | 10-150330 | 6/1998 |

* cited by examiner

Primary Examiner—Nay Maung
(74) Attorney, Agent, or Firm—Scully, Scott, Murphy & Presser

(57) ABSTRACT

There is provided a radio type selective calling receiver including (a) a front end for converting a received signal into a first signal having an intermediate frequency, (b) a detector for detecting an electric field strength, based on the first signal, and demodulating the first signal, (c) a decoder for analyzing the thus demodulated first signal, (d) a voltage to current converter for converting a voltage defined by the electric field strength into a current, and (e) an automatic gain controller for receiving the voltage. In accordance with the radio type selective calling receiver, it is possible to accurately operate the automatic gain controller (AGC) without a drop in an input signal.

12 Claims, 6 Drawing Sheets

RADIO TYPE SELECTIVE CALLING RECEIVER AND METHOD OF RECEIVING SELECTIVE CALLING

BACKGROUND OF THE INVENTION

1. Field of the Invention

The invention relates to a radio type selective calling receiver which accomplishes automatic gain control (AGC) in accordance with an electric field strength of received signals, and further to a method of receiving selective calling.

2. Description of the Related Art

A demand for pager system has recently remarkably increased due to development in mobile communication, and hence, there has been increased frequencies transmitted to radio type selective calling receivers from base stations. A radio type selective calling receiver includes an antenna having a wide band characteristic for receiving a number of frequencies, and picking up a desired signal and modulating it in sequential stages.

If a frequency is in connection with one wave, a receiver characteristic or IM characteristic is not harmfully influenced, even if a received signal had a great electric field strength. However, if a frequency is in connection with a plurality of waves, there would occur spurious due to saturation in a circuit, which would exert harmful influence on the receiver characteristic or IM characteristic.

In order to avoid such spurious, a radio type selective calling receiver is usually designed to accomplish automatic gain control (AGC) for detecting an electric field strength of a received signal, adjusting a gain of a front end thereof, and improving a receiver characteristic or IM characteristic.

A detector for detecting an electric field strength of a received signal detects amplitudes of intermediate frequency (IF) signals from respective stages of a multi-stage limiting amplifier which limits IF signals indispensable for FM signals, smoothes the thus detected amplitudes by means of a rectifier circuit, and converts into a dc voltage in accordance with a relation between an electric field strength and a dc voltage in a received signal. In AGC, the thus converted dc voltage is used for controlling a gain of a front end to thereby improve a receiver characteristic or IM characteristic.

However, a conventional radio type selective calling receiver is accompanied with a problem, as follows. Since the above-mentioned detector detects amplitudes of IF signals from respective stages of a multi-stage limiting amplifier, converts IF signals into a current by means of a rectifier circuit, totally adds the thus converted current, and obtains a voltage by passing the current through a resistor, the detector could have a quite small ability for providing a current. Hence, if the detector would provide a current to a circuit which accomplishes AGC, there is a fear that a voltage for operating the selective calling receiver might be dropped.

Japanese Unexamined Patent Publication No. 6-213676 having been published on Aug. 5, 1994, based on U.S. patent application Ser. No. 974631 having the filing date of Nov. 23, 1992, has suggested an indicator for indicating a strength of a received signal. The suggested indicator is comprised of a plurality of voltage amplifiers, a plurality of rectifiers, a plurality of voltage to current converters, and a current adding circuit. Each of the voltage amplifiers includes a pair of differential transistors driven by a first current which is in proportion to a temperature in order to keep a gain constant. Each of the voltage to current converters includes a pair of second differential transistors driven by a second current in proportion to a temperature, but in inverse proportion to a process parameter, and a third transistor driven by a third current in inverse proportion to a process parameter.

Japanese Unexamined Patent Publication No. 8-139632 having been published on May 31, 1996 has suggested a narrow band transceiver capable of operating AGC at a high speed without malfunction. The suggested transceiver is comprised of a receiver, a digital signal processor for demodulating an output signal transmitted from the receiver and transmitting a signal produced by modulating audio inputs, a transmitter, a detector for detecting an electric field strength of an output transmitted from the receiver, an indicator for indicating whether the transceiver is in receiving or transmitting mode, and a power controller for controlling power to be supplied to components of the transceiver in accordance with outputs transmitted from the detector and the indicator.

Japanese Unexamined Patent Publication No. 8-307172 having been published on Nov. 22, 1996 has suggested an amplifier having a variable gain. The suggested amplifier is comprised of a differential amplifying circuit having a gain variable in accordance with a bias voltage, transistors included in the differential amplifying circuit for amplification, and a circuit for compensating for temperature characteristic of gains of the transistors.

Japanese Unexamined Patent Publication No. 9-223950 having been published on Aug. 26, 1997 has suggested VCO circuit including a ring oscillator. A voltage to be applied to VCO circuit is inverted into a constant current signal by virtue of a saturation region of output characteristic of a field effect transistor. The thus produced constant current signal is supplied to the ring oscillator for driving.

SUMMARY OF THE INVENTION

In view of the above-mentioned problems of the prior art, it is an object of the present invention to provide a radio type selective calling receiver capable of operating an AGC circuit without a drop in an operating voltage.

In one aspect, there is provided a radio type selective calling receiver including (a) a detector for detecting an electric field strength of a received radio signal, based on signals having an intermediate frequency, (b) a converter for converting a voltage associated with the thus detected electric field strength into a current, and (c) an automatic gain control circuit for receiving an output transmitted from the converter.

It is preferable that the selective calling receiver is of either super heterodyne type or direct conversion type for receiving a radio signal.

It is preferable that the radio type selective calling receiver further includes a power source which provides an intermittent voltage to the converter.

It is preferable that the radio type selective calling receiver further includes a dc voltage source, and a controller providing an intermittent voltage to the converter by applying intermittent control signals to a dc voltage supplied from the dc voltage source.

It is preferable that the radio type selective calling receiver further includes a dc voltage source, a controller, and a stabilizer, the controller providing an intermittent voltage to the converter by applying intermittent control signals to a dc voltage supplied from the dc voltage source, the stabilizer providing an intermitted voltage to elements other than the converter.

There is further provided a radio type selective calling receiver (a) a front end for converting a received signal into a first signal having an intermediate frequency, (b) a detector for detecting an electric field strength, based on the first signal, and demodulating the first signal, (c) a decoder for decoding the thus demodulated first signal, (d) a voltage to current converter for converting a voltage defined by the electric field strength into a current, and (e) an automatic gain controller for receiving the voltage from the voltage to current converter and controlling a gain of the front end.

In another aspect of the invention, there is provided a method of receiving selective calling, including the steps of (a) detecting an electric field strength of a received radio signal, (b) converting a voltage associated with the thus detected electric field strength into a current, and (c) transmitting the voltage to an automatic gain control circuit.

It is preferable that the voltage is converted into a current in accordance with an intermittent voltage.

In accordance with the present invention, it is possible to drive an automatic gain control (AGC) circuit without a drop in input signals.

In addition, the use of an intermittent voltage for driving the voltage to current converter makes it possible to use a single circuit battery as a power source.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 1:
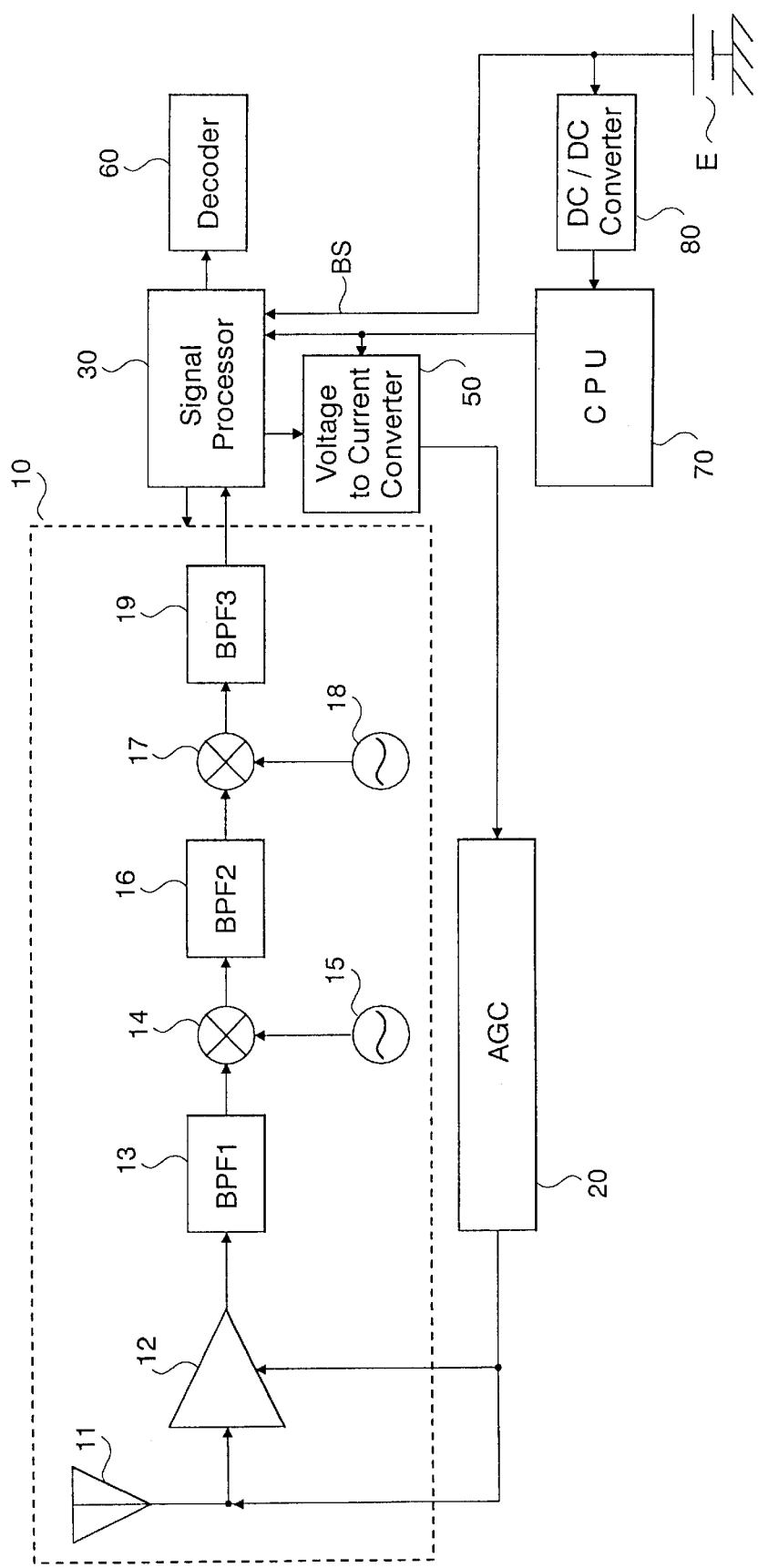
FIG. 1 is a block diagram of a radio type selective calling receiver in accordance with the first embodiment of the present invention.

FIG. 1 illustrates a radio type selective calling receiver in accordance with the first embodiment.

The illustrated selective calling receiver is of a super heterodyne type receiver employing frequency shift keying (FSK) modulation system. The illustrated selective calling receiver is comprised of a front end 10, a signal processor 30 electrically connected to the front end 10, a decoder 60 receiving a signal transmitted from the signal processor 30, a voltage to current converting circuit 50 electrically connected to the signal processor 30, an automatic gain control circuit 20 receiving a current from the voltage to current converting circuit 50, a cell E providing electric power to the signal processor 30, a DC/DC converter 80 electrically connected to the cell E, and a central processing unit (CPU) 70 electrically connected to both the DC/DC converter 80 and the signal processor 30.

The front end 10 is comprised of an antenna 11, a high frequency amplifier 12 for amplifying signals having been received by the antenna 11, a first band pass filter (BPF1) 13 receiving output signals transmitted from the high frequency amplifier 12, a second band pass filter (BPF2) 16, a third band pass filter (BPF3) 19, a first mixer 14 positioned between the first and second band pass filters 13 and 16, a first local oscillator 15 connected to the first mixer 14, a second mixer 17 positioned between the second and third band pass filters 16 and 19, and a second local oscillator 18 connected to the second mixer 17.

The front end 10 having the above-mentioned structure converts signals received at the antenna 11 into signals having an intermediate frequency (IF). The thus converted IF signals are transmitted to the signal processor 30, where the IF signals are demodulated, and an electric field strength is detected based on the IF signals. The signals demodulated by the signal processor 30 are transmitted to the decoder 60, and decoded.

In operation, the signal processor 30 detects voltage amplitudes of the IF signals which amplitudes vary in accordance with an electric field strength of signals received at the antenna 11, and calculates the electric field strength based on the thus detected amplitude. Then, the signal processor 30 converts the thus calculated electric field strength into a voltage (VRSO) in accordance with a relation between an electric field strength and a dc voltage in received signals, illustrated in FIG. 4.

Figure 4:
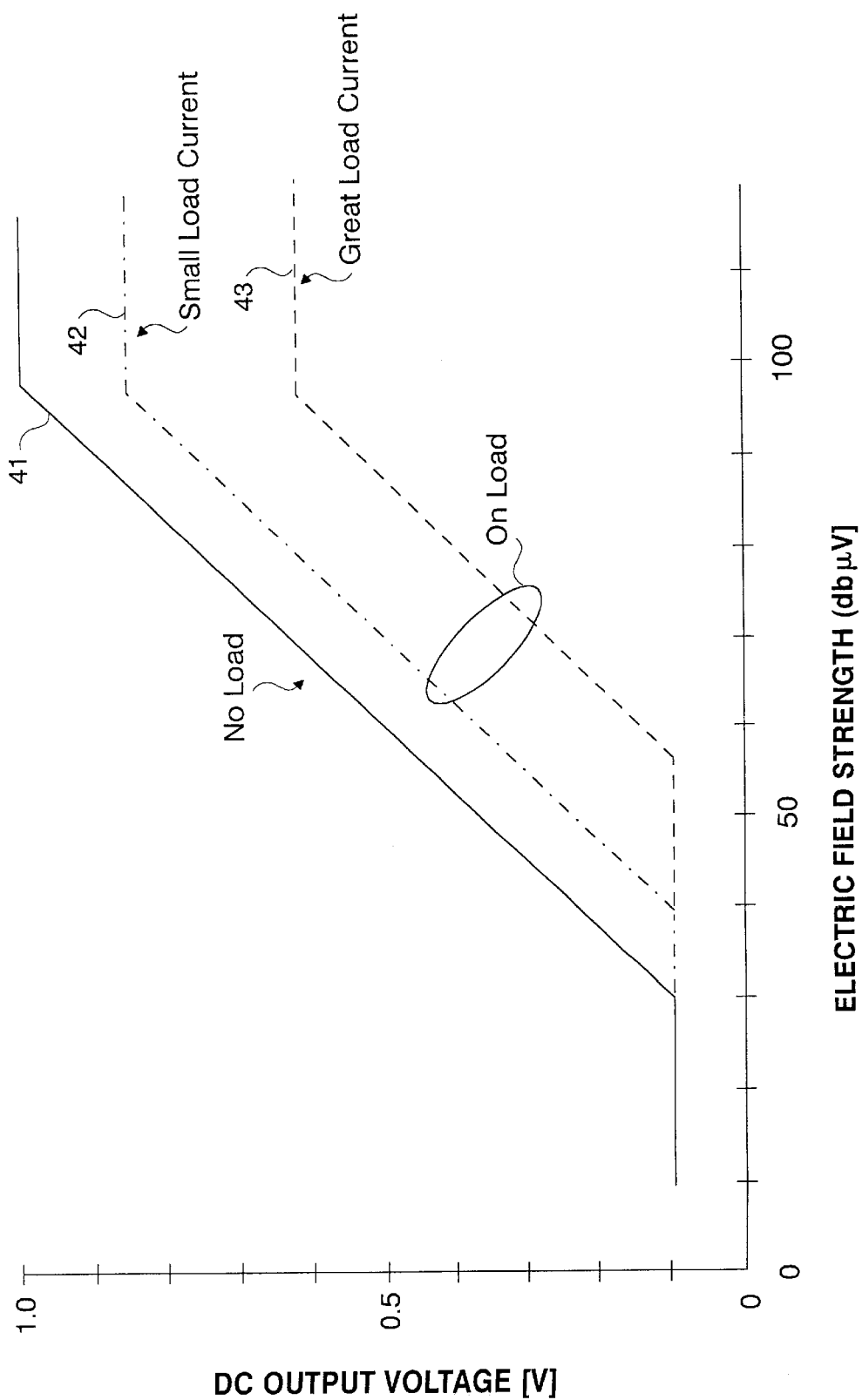
FIG. 4 is a graph showing a characteristic of an electric field strength to a dc voltage in a received signal.

In FIG. 4, a solid line 41 shows a relation between an electric field strength and a dc voltage when there is no load current, a dashed line 42 shows a relation between an electric field strength and a dc voltage when there is small load current, and a broken line 43 shows a relation between an electric field strength and a dc voltage when there is great load current.

The electric field strength voltage (VRSO) is transmitted to the voltage to current converting circuit 50, and is converted into a load current by the voltage to current converting circuit 50. The thus converted load current is provided to the AGC circuit 20. Hence, the AGC circuit 20 can receive the load current without a drop in the electric field strength voltage (VRSO).

A voltage for driving the voltage to current converting circuit 50 is provided to the circuit 50 in accordance with a control signal voltage transmitted from CPU 70. Hence, the voltage to current converting circuit 50 receives an intermittent voltage for operation thereof.

If the antenna 11 receives two or more signals forming an electric field having a great strength, circuits constituting the front end 10 are saturated with the result of deterioration in receiver characteristics (IM characteristics). In order to avoid this, the AGC circuit 20 controls gains of the antenna 11 and the high frequency amplifier 12 both of which define receiver characteristics, to thereby keep them unsaturated by virtue of the electric field strength voltage (VRSO) transmitted from the signal processor 30.

The radio type selective calling receiver in accordance with the first embodiment can be grouped into a radio signal processing system including the front end 10 and the signal processor 30, and a control system including the decoder 60 decoding the demodulated signals, and CPU 70 controlling an operation of the radio type selective calling receiver.

The radio signal processing system operates with at least one volt, and hence, can be operated by means of the cell E. The control system needs at least two volts for operation. Hence, it is necessary to raise a voltage supplied by the cell E up to a requisite voltage by means of the DC/DC converter 80.

A voltage of the cell E drops with the lapse of time. Hence, in order to keep stable operation, a voltage of the cell E is transmitted to a later mentioned stabilizer 38 (see FIG. 2) to thereby keep the voltage at 1.0 V. The thus stabilized voltage is supplied to both the front end 10 and the signal processor 30. A control for operating the voltage to current converting circuit 50 in intermittent fashion is carried out by turning the stabilizer 38 on or off.

Hence, control signals BS for carrying out intermittent operation, transmitted from CPU 70 to the signal processor 30, have an amplitude in the range of 0V to 2V, if a source voltage is equal to 2V. A source voltage for the voltage to current converting circuit 50 is supplied through the control signals BS.

By the use of the control signals BS transmitted from CPU 70 to the signal processor 30, it is possible to apparently use a single circuit voltage of 1V to operate the signal processor 30 without adding a voltage terminal of 2V to the signal processor 30.

Figure 2:
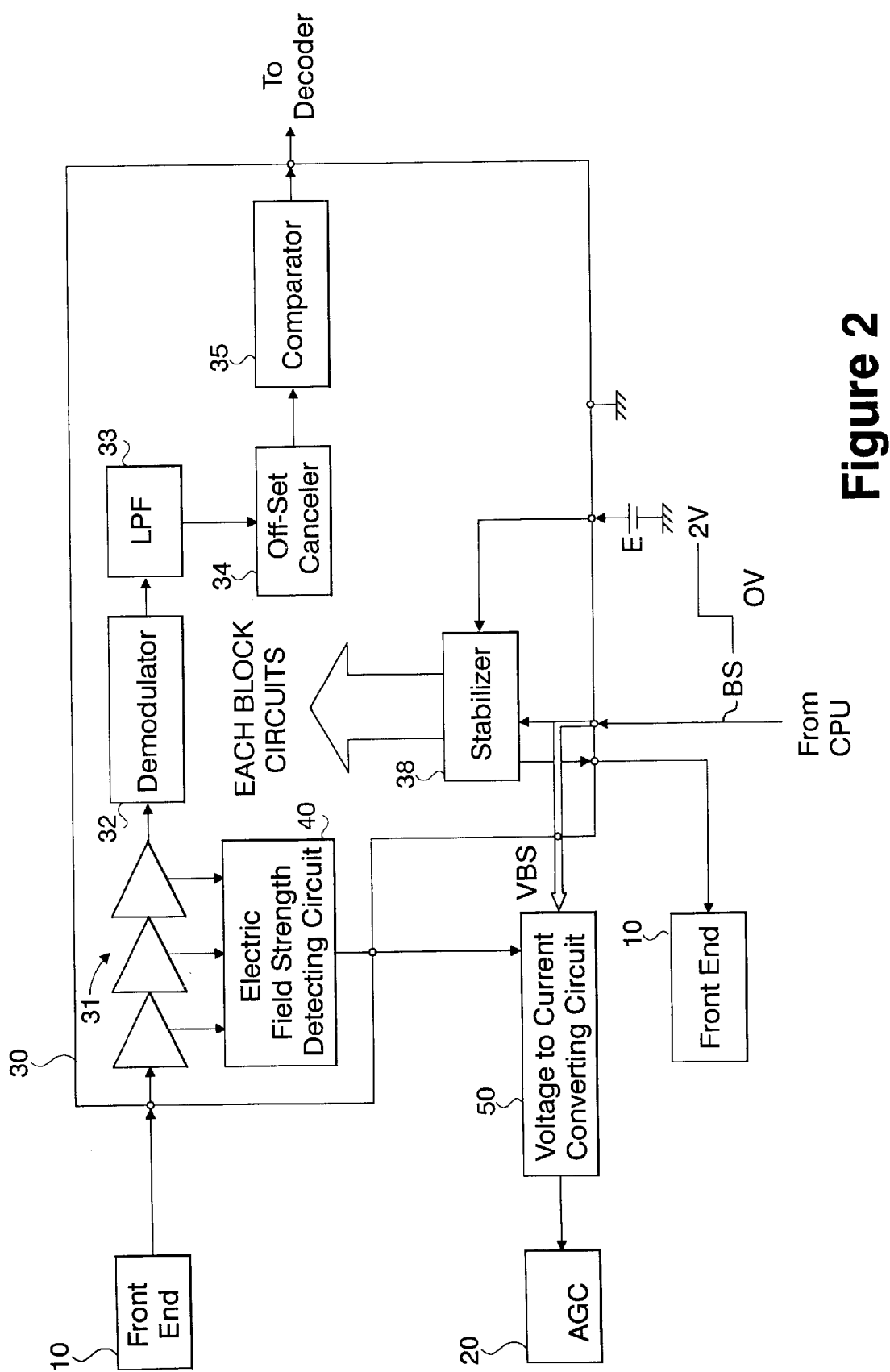
FIG. 2 is a block diagram of a signal processor constituting the radio type selective calling receiver illustrated in FIG. 1.

FIG. 2 is a block diagram of the signal processor 30 constituting the radio type selective calling receiver.

The signal processor 30 is comprised of a multi-stage limiting amplifier 31 for amplifying the IF signals transmitted from the front end 10, a demodulator 32 for demodulating the amplified IF signals transmitted from the multi-stage amplifier 31, a low pass filter 33 for removing high frequency signals among the demodulated IF signals, an off-set canceler 34, a comparator 35, and an electric field strength detecting circuit 40 receiving amplitudes from respective stages of the multi-stage limiting amplifier 31, and producing a voltage accordingly.

The IF signals transmitted from the front end 10 is amplified in the multi-stage limiting amplifier 31, and then demodulated in the demodulator 32. Then, the IF signals are transmitted to the decoder 60 through the low pass filter 33, the off-set canceler 34, and the comparator 35.

The electric field strength voltage VRSO is detected in the multi-stage limiting amplifier 31 and the electric field strength detecting circuit 40.

Figure 5:
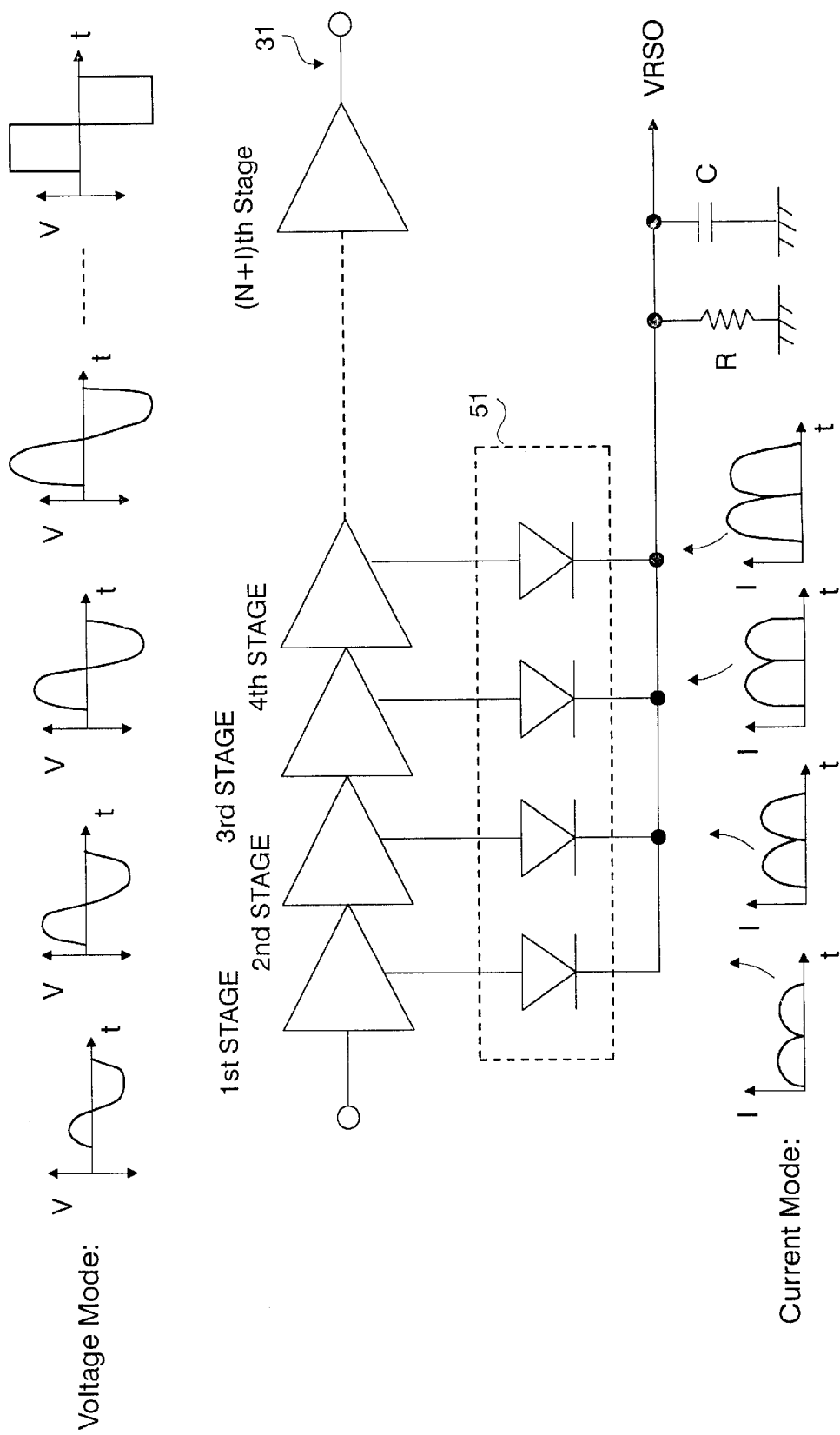
FIG. 5 is a block diagram of a signal processor constituting the radio type selective calling receiver illustrated in FIG. 1.

FIG. 5 illustrates an example of the electric field strength detecting circuit 40 for detecting an electric field strength.

As illustrated in FIG. 5, the multi-stage limiting amplifier 31 is comprised of (N+1) stages each of which is connected to a rectifying circuit 51. The rectifying circuit 51 is electrically connected to a resistor R and a capacitor C.

The electric field strength voltage VRSO is obtained by converting a signal received at the antenna 11 into a dc voltage, as follows. Respective stages of the multi-stage limiting amplifier 31 detects amplitudes of voltages in the IF signals. The thus detected voltages are rectified by means of the rectifying circuit 51 which rectifies both plus and minus waves, and then smoothed by means of the capacitor C. Thus, there is produced a dc voltage which is in proportion to an electric field strength.

Specifically, the amplitudes of voltages of the IF signals, detected by respective stages of the multi-stage limiting amplifier 31, are converted into current by means of the rectifying circuit 51. The thus rectified current is added to one another. Then, the thus added current is converted into a voltage by passing them through the resistor R.

An example of a rectifying circuit which rectifies both plus and minus waves, such as the rectifying circuit 50, is suggested in Japanese Unexamined Patent Publication No. 8-316736, and an example of an electric field strength detecting circuit such as the electric field strength detecting circuit 40 is suggested in Japanese Unexamined Patent Publication No. 10-150330.

Since the amplitudes in respective stages of the multi-stage limiting amplifier 31 are converted into current by means of the rectifying circuit 51, and then the thus produced current is converted into a voltage by passing through the resistor R, the electric field strength voltage VRSO may be dropped, if a load current is taken out of the electric field strength detecting circuit 40. Hence, the voltage to current converting circuit 50 is positioned between the electric field strength detecting circuit 40 and the AGC circuit 20, as illustrated in FIG. 2, to thereby prevent a drop in the electric field strength voltage VRSO and make it possible to supply a load current to the AGC circuit 20.

Figure 3:
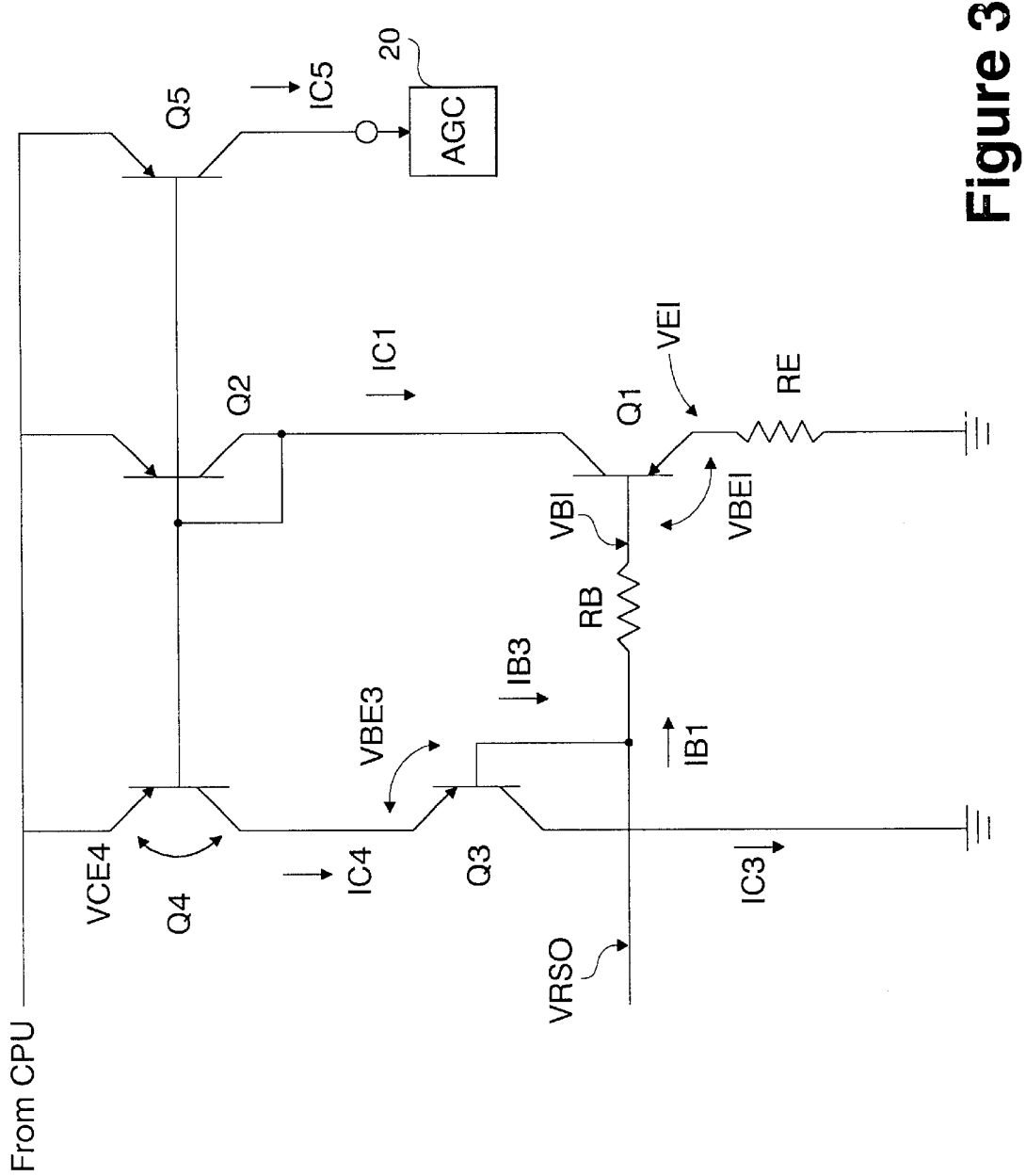
FIG. 3 is a circuit diagram of a voltage to current converting circuit constituting the radio type selective calling receiver illustrated in FIG. 1.

FIG. 3 is a circuit diagram of an example of the voltage to current converting circuit 50 converting the electric field strength voltage VRSO into a load current.

As illustrated in FIG. 3, the voltage to current converting circuit 50 is comprised of a first NPN transistor Q1, a second PNP transistor Q2, a third PNP transistor Q3, a fourth transistor Q4, a fifth transistor Q5, a first resistor RB, and a second resistor RE.

The first NPN transistor Q1 has an emitter which is grounded through the second resistor RE, a base to which the electric field strength voltage VRSO is applied through the first resistor, and a collector electrically connected to a collector of the second PNP transistor.

The second PNP transistor Q2 has an emitter to which the control signals BS are transmitted from CPU 70, a base electrically connected to bases of the fourth PNP transistor Q4 and the fifth PNP transistor Q5, and a collector electrically connected to the collector of the first NPN transistor Q1. The collector and the base are short-circuited to each other.

The third PNP transistor Q3 has an emitter electrically connected to a collector of the fourth PNP transistor Q4, a grounded collector, and a base electrically connected to the base of the first NPN transistor Q1 through the first resistor RB.

The fourth PNP transistor Q4 has an emitter to which the control signals BS are transmitted from CPU 70, a collector electrically connected to the emitter of the third PNP transistor Q3, and a base electrically connected to the bases of the second PNP transistor Q2 and the fifth PNP transistor Q5.

The fifth PNP transistor Q5 has an emitter to which the control signals BS are transmitted from CPU 70, a collector electrically connected to the AGC circuit 20, and a base electrically connected to the bases of the second PNP transistor Q2 and the fourth PNP transistor Q4.

The second, fourth, and fifth PNP transistors Q2, Q4 and Q5 cooperate with one another to constitute a current mirror circuit.

The AGC circuit 20 is designed to operate when the electric field strength voltage VRSO is equal to or higher than 0.7 V. When the electric field strength voltage VRSO is over 0.7 V, a base current IB1 flows to the base of the first NPN transistor Q1, and a collector current IC1 of the first NPN transistor Q1 is amplified up to a current equal to a base current IB1 multiplied by HEF. Herein, HEF is a current amplification factor of a PNP transistor.

The collector current IC1 is fed back by the current mirror circuit constituted by the second, fourth, and fifth PNP transistors Q2, and Q5. A collector current IC4 of the fourth PNP transistor Q4 is added into a collector current IC3 of the third PNP transistor Q3. Herein, the collector current IC4 is equal in an amount to the collector current IC1.

Since the base of the third PNP transistor Q3 is electrically connected to the base of the first PNP transistor Q1, the base current IB1 of the first PNP transistor Q1 is compensated for by a base current IB4 of the third PNP transistor Q3 (IB4=IC4/HFE=IB1). Hence, a load current is not taken out of the electric field strength voltage VRSO.

A collector current IC5 of the fifth PNP transistor Q5 is supplied to the AGC circuit 20 to thereby drive the AGC circuit 20 therewith. Herein, the collector current IC6 is equal in an amount to the collector current IC1. The base current IB1 of the first NPN transistor Q1 is dependent on the first and second resistors RB and RE.

The base current IB1 is defined as follows.

IB1=(VRSO−VB1)/RB

=(VRSO−(VE1+VBE1))/RB

=(VRSO−(IC1×RE+VBE1))/RB

=(VRSO−(IB1×HFE×RE+VBE1))/RB

Hereinbelow is explained the reason why the control signals BS for intermittent operation are transmitted from CPU 70 to the voltage to current converting circuit 50 as a source voltage VBS.

The electric field strength detecting circuit 40 transmits an output voltage which is equal to or below about 1V relative to an input field strength. The AGC circuit 20 operates with a voltage in the range of 0.7 V or greater. Hence, a voltage in the range of 0.7 V to 1 V is applied to a base of the third PNP transistor Q3.

A requisite source voltage for the voltage to current converting circuit 50 is equal to a sum of a voltage VBE3 between a base and an emitter in the third PNP transistor Q3 and a voltage VCE4 between a collector and an emitter in the fourth PNP transistor Q4. That is, the source voltage VBS is defined as follows.

VBS≧VRSO+VBE3+VCE4

Now it is assumed that the voltage VBE3 is equal to 0.7 V and the voltage VCE4 is equal to 0.2 V or greater. A maximum of the electric field strength voltage VRSO is equal to 1 V, which is equal to a base voltage of the third PNP transistor Q3. Accordingly, the source voltage VBS has to be equal to or greater than 1.9 V (VBS≧1.9 V). Since the cell E has a voltage of 1 V, the cell E could not drive the voltage to current converting circuit 50. Thus, the voltage to current converting circuit 50 can be operated even by the cell E, if a source voltage for the voltage to current converting circuit 50 is an intermittent voltage.

Second Embodiment

Figure 6:
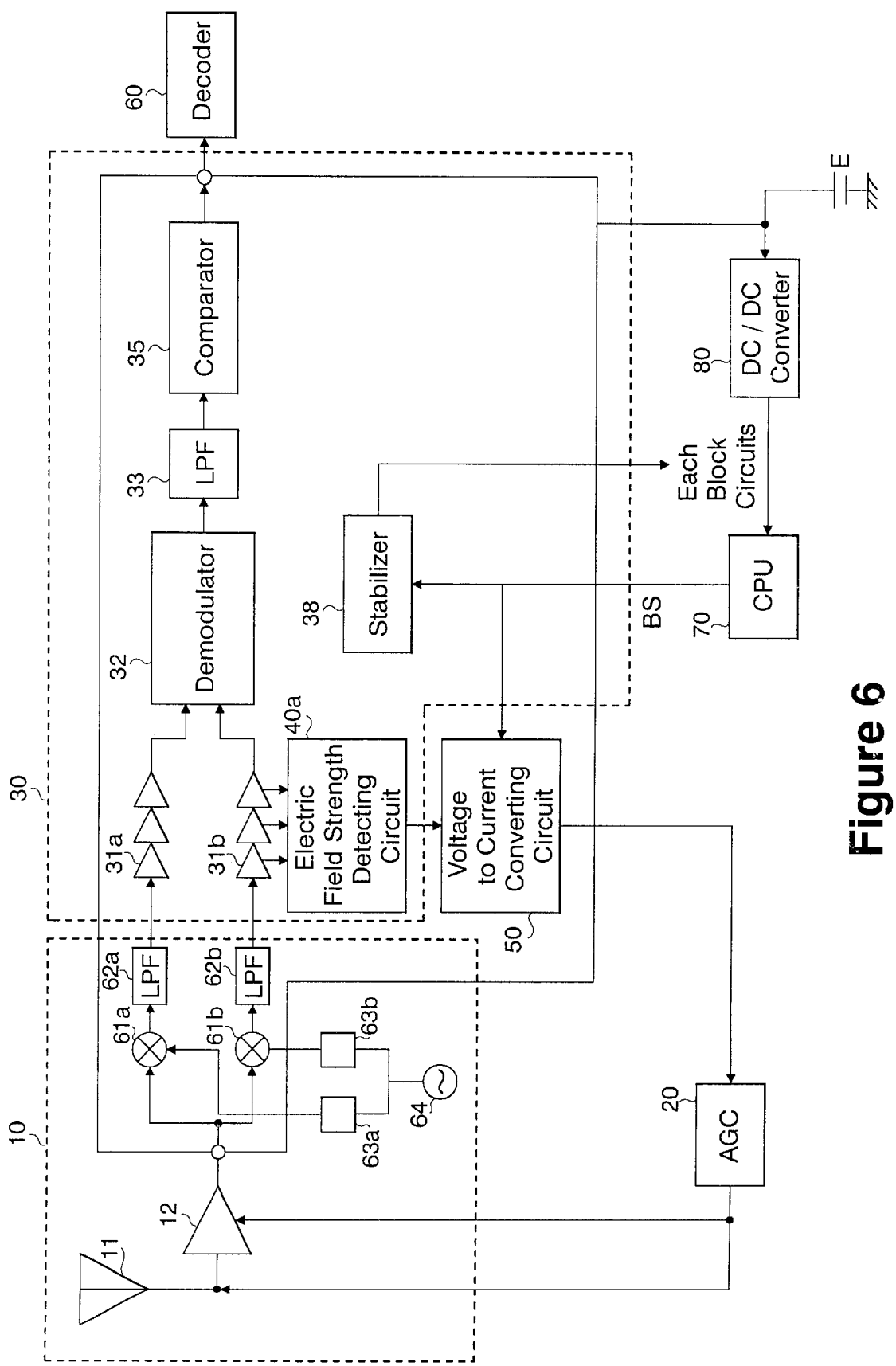
FIG. 6 is a block diagram of a radio type selective calling receiver in accordance with the second embodiment of the present invention.

FIG. 6 is a block diagram of a radio type selective calling receiver in accordance with the second embodiment.

The second embodiment is different from the first embodiment in signal receiving system. That is, the radio type selective calling receiver in accordance with the second embodiment receives signals in direct conversion system, whereas the radio type selective calling receiver in accordance with the first embodiment receives signals in super heterodyne system.

The illustrated selective calling receiver is comprised of a front end 10, a signal processor 30 electrically connected to the front end 10, a decoder 60 receiving a signal transmitted from the signal processor 30, a voltage to current converting circuit 50 electrically connected to the signal processor 30, an automatic gain control circuit 20 receiving a load current from the voltage to current converting circuit 50, a cell E providing electric power to the signal processor 30, a DC/DC converter 80 electrically connected to the cell E, and a central processing unit (CPU) 70 electrically connected to both the DC/DC converter 80 and the signal processor 30.

The front end 10 is comprised of an antenna 11, a high frequency amplifier 12 for amplifying signals having been received by the antenna 11, first and second mixers 61a and 61b both receiving amplified signals from the high frequency amplifier 12, first and second low pass filters (LPF) 62a and 62b receiving signals from the first and second mixers 61a and 61b, respectively, first and second phase shifters 63a and 63b electrically connected to the first and second mixers 61a and 61b, respectively, and a local oscillator 64 electrically connected to both the first and second phase shifters 63a and 63b.

The signal processor 30 is comprised of first and second multi-stage limiting amplifiers 31a and 31b for amplifying signals transmitted from LPFs 62a and 62b, a demodulator 32 for demodulating the amplified signals transmitted from the first and second multi-stage amplifiers 31a and 31b, a low pass filter 33 for removing high frequency signals among the demodulated IF signals, a comparator 35 electrically connected to the low pass filter 33, an electric field strength detecting circuit 40a receiving amplitudes from respective stages of the first and second multi-stage limiting amplifiers 31a and 31b and producing a voltage accordingly, and a stabilizer 38 for stabilizing a voltage of the cell E at a certain voltage.

The electric field strength detecting circuit 40a has the same structure as the structure of the electric field strength detecting circuit 40 in the first embodiment, but is different from the electric field strength detecting circuit 40 in that the electric field strength detecting circuit 40a in the second embodiment deals with base band signals having a frequency of 5 KHz, whereas the electric field strength detecting circuit 40 in the first embodiment deals with IF signals having a frequency of 455 KHz.

An operation of the second embodiment other than the above-mentioned one is the same as that of the first embodiment.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-41701 filed on Feb. 24, 1998 including specification, claims, drawings and summary is incorporated herein by reference in its entirety.

What is claimed is:

1. A radio type selective calling receiver comprising:
   (a) a detector for detecting an electric field strength of a received radio signal, based on signals having an intermediate frequency;
   (b) a converter for converting a voltage associated with the detected electric field strength into a current; and (c) an automatic gain control circuit for receiving an output transmitted from said converter, wherein said converter is positioned between said detector and said automatic gain control circuit for preventing a drop of the voltage associated with the detected electric field strength.

2. The radio type selective calling receiver as set forth in claim 1, wherein said selective calling receiver is of super heterodyne type for receiving a radio signal.

3. The radio type selective calling receiver as set forth in claim 1, wherein said selective calling receiver is of direct conversion type for receiving a radio signal.

4. The radio type selective calling receiver as set forth in claim 1, further comprising a power source which provides an intermittent voltage to said converter.

5. The radio type selective calling receiver as set forth in claim 1, further comprising a dc voltage source, and a controller providing an intermittent voltage to said converter by applying intermittent control signals to a dc voltage supplied from said dc voltage source.

6. The radio type selective calling receiver as set forth in claim 1, further comprising a dc voltage source, a controller, and a stabilizer, said controller providing an intermittent voltage to said converter by applying intermittent control signals to a dc voltage supplied from said dc voltage source, said stabilizer providing an intermitted voltage to elements other than said converter.

7. A radio type selective calling receiver comprising:
(a) a front end for converting a received signal into a first signal having an intermediate frequency;
(b) a detector for detecting an electric field strength, based on said first signal, and demodulating said first signal;
(c) a decoder for decoding the demodulated first signal;
(d) a voltage to current converter for converting a voltage defined by said electric field strength into a current; and
(e) an automatic gain controller for receiving said voltage from said voltage to current converter and controlling a gain of said front end, wherein said voltage to current converter is positioned between said detector and said automatic gain controller for preventing a drop of the voltage defined by said electric field strength.

8. The radio type selective calling receiver as set forth in claim 7, further comprising a power source which provides an intermittent voltage to said voltage to current converter.

9. The radio type selective calling receiver as set forth in claim 7, further comprising a dc voltage source, and a controller providing an intermittent voltage to said voltage to current converter by applying intermittent control signals to a dc voltage supplied from said dc voltage source.

10. The radio type selective calling receiver as set forth in claim 7, further comprising a dc voltage source, a controller, and a stabilizer, said controller providing an intermittent voltage to said voltage to current converter by applying intermittent control signals to a dc voltage supplied from said dc voltage source, said stabilizer providing an intermitted voltage to elements other than said converter.

11. A method of receiving selective calling, comprising the steps of:
(a) detecting an electric field strength of a received radio signal, utilizing a detector;
(b) converting a voltage associated with the detected electric field strength into a current for preventing a drop of the voltage associated with the detected electric field strength, utilizing a converter; and
(c) transmitting said current to an automatic gain control circuit wherein the converter is positioned between the detector and the automatic gain control circuit.

12. The method as set forth in claim 11, wherein said voltage is converted into a current in accordance with an intermittent voltage.

* * * * *